H. W. BURKHARDT, Jr.
MEANS FOR CONVEYING MEAT TO BE STUFFED FROM MIXING TO STUFFING MACHINES.
APPLICATION FILED SEPT. 6, 1917.
1,311,493.
Patented July 29, 1919.
2 SHEETS—SHEET 1.
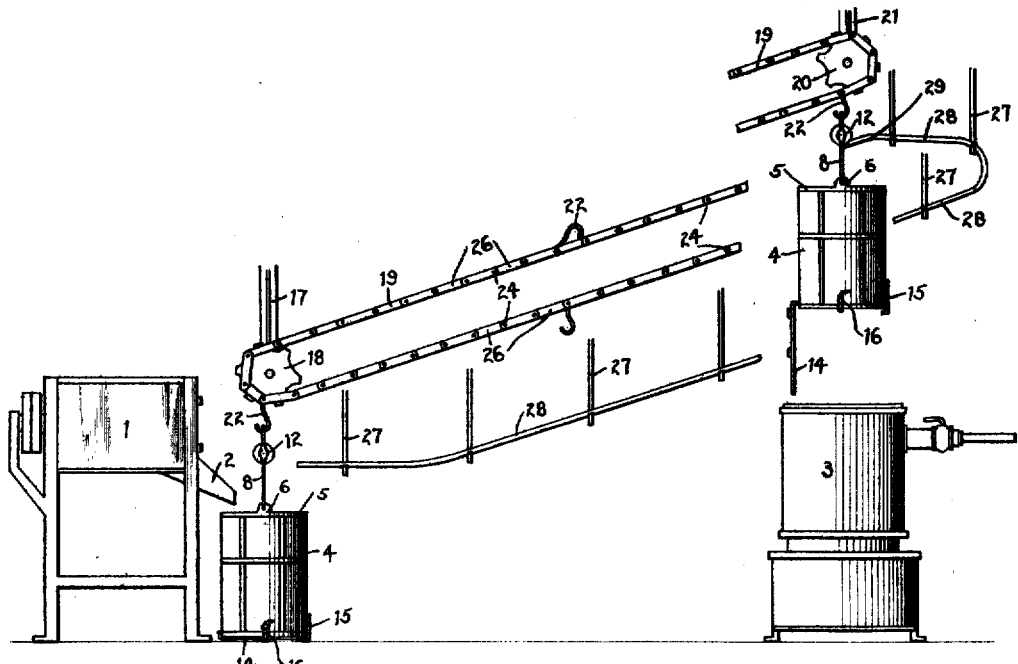
Fig. 1
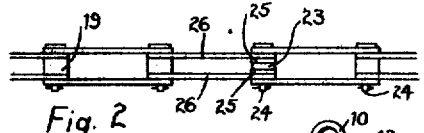
Fig. 2
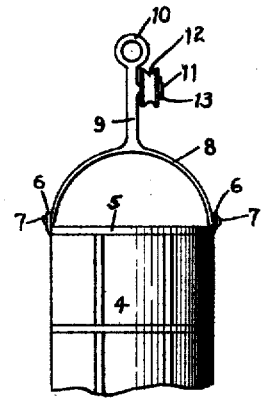
Fig. 3
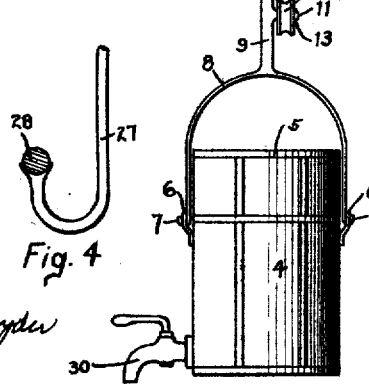
Fig. 4
Fig. 5

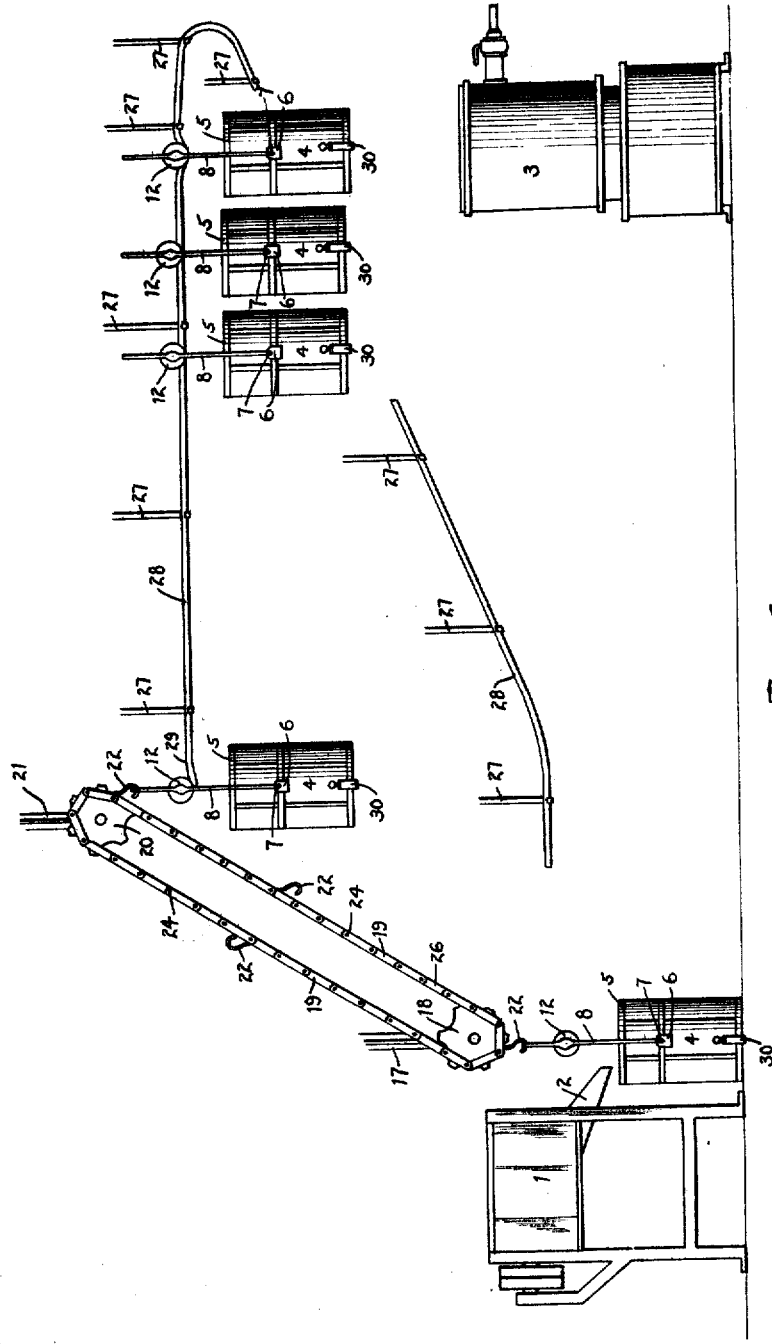

UNITED STATES PATENT OFFICE.

HENRY W. BURKHARDT, JR., OF DAYTON, OHIO.

MEANS FOR CONVEYING MEAT TO BE STUFFED FROM MIXING TO STUFFING MACHINES.

1,311,493.　　　　Specification of Letters Patent.　　Patented July 29, 1919.

Application filed September 6, 1917. Serial No. 189,979.

*To all whom it may concern:*

Be it known that I, HENRY W. BURKHARDT, Jr., a citizen of the United States, residing at Dayton, in the county of Montgomery and State of Ohio, have invented a new and useful Improvement in Means for Conveying Meat to be Stuffed from Mixing to Stuffing Machines, of which the following is a specification.

This invention relates to a new and useful improvement in means for conveying meat to be stuffed from mixing to stuffing machines in slaughter houses.

The principal object of my invention is to provide simple and effectual means whereby the meat made ready for stuffing in a mixing machine, may be conveyed to the stuffer in an easy, quick and sanitary manner. My invention is labor-saving, in that a number of handling operations now necessary under the present method, are eliminated. By the use of my improved device the meat need not be touched by the hands, nor is there any danger of it falling upon the floor, as is often the case where it is hauled from the mixer to the stuffer under the present method.

In the accompanying drawings, Figure 1 is a divided side-elevational view of my improved means for conveying the meat to be stuffed, from the mixer to the stuffer. Fig. 2 is a top plan view of the endless conveying chain. Fig. 3 is a front view of the conveying bucket. Fig. 4 is a side view of the rail supporting members, showing the rail in section. Fig. 5 is a front view of a conveying bucket to which the bail is pivoted at its upper middle portion. And Fig. 6 is a side elevational view of my improved conveying means designed for use in large slaughter houses where a number of buckets may be filled and held on the track before being emptied in one or more stuffers.

Throughout the specification and drawings, similar reference characters denote corresponding parts.

In a detailed description of the preferred form of embodiment of my invention, the numeral 1 designates a machine for mixing the meat preparatory to being stuffed. The mixer 1 is preferably provided with a side-trough delivery 2, although my improved conveying means may be used with mixing machines which open at the bottom. The numeral 3 designates a stuffing machine located away from the mixer 1, and to which it is desired to deliver the meat therefrom in a quick, easy and sanitary manner.

For the purpose of accomplishing the above end without hauling the meat on the floor from the mixer to the stuffer, I have provided the following described means. Referring to Figs. 1 and 3, the numeral 4 designates an elongated metallic or wooden bucket or conveyer of a height which will permit it to be readily slipped under the delivery trough 2 of the mixer 1. The top of the bucket 4 is preferably encircled by a metallic band 5 from which a pair of ears 6 6 upwardly project. Each of the ears 6 contains a hole which loosely receives a hook end 7 of a bail 8. The latter has a vertical neck portion 9 which terminates in a ring head 10 for a purpose to be hereinafter described. Projecting laterally from the neck portion 9 of the bail 8 is a stud 11 that forms the bearing for a pulley 12 which is held thereon by a cotter pin 13. Suitably pivoted to one side of the bucket 4 at its extreme lower end, is a preferably swinging bottom 14 whose free end is adapted to be engaged by a catch member 15 to close the lower end of said bucket in a practically water-tight manner. The bucket 4 is also provided at its lower end with a side faucet 16 to deliver liquid matter therefrom without the necessity of opening its bottom 14.

Suitably pivoted to a hanger 17 supported from the ceiling, wall or other medium near the mixer 1, is a sprocket wheel 18 around which travels a sprocket chain 19 consisting of the usual short links and pivot pins and sleeves as shown in Fig. 2. This chain 19 also passes around a sprocket wheel 20 suitably supported by a hanger 21 above the stuffing machine 3. At intervals throughout its length a hook 22 is secured to the sprocket chain 19 in the following manner. Each hook 22 has an eyelet end 23 through which one of the connecting pins 24 of the sprocket chain loosely passes, said hook end 23 being held in the middle of the connecting pin by sleeve bands 25 25 that surround it, with one band on each side of the hook end between the parallel links 26 26 of the chain. (See Fig. 2.)

Depending from the ceiling or other suitable support, is a series of hook-shaped rail supporting members 27. Resting upon the upturned ends of the members 27 is a rail or track 28, one end of which is located a short distance below the sprocket wheel 20, while the other end thereof terminates on a much lower level near the mixer 1. The purpose and arrangement of this track will now be described in connection with the operation of my improved conveying means.

After the meat has been prepared for stuffing in the mixer 1, the conveying bucket 4 is preferably brought to the position shown in Fig. 1 to receive through its upper open end the stuffing material from the delivery trough 2 of said mixer. One of the hooks 22 is then brought to a position wherein its hook end may be readily thrust through the ring head 10 of the conveyer bail 8.

After the bucket 4 is filled, it is ready for movement by the lower run of the chain 19 to a position under the sprocket wheel 20 and sufficiently above the stuffer 3 to permit the bottom 14 to swing downward to empty the contents of said bucket into the stuffer. The upward movement of the bucket 4 may best be effected by hand or other power applied to any one of the sprocket shafts.

When the bucket 4 reaches its upper position below the sprocket wheel 20, the catch 15 is disengaged from the bottom 14 to permit the latter to swing downwardly by gravity to empty the contents of the bucket into the stuffer 3. The bottom 14 of the bucket 4 is then swung to its closing position preparatory to the descent of the bucket as follows, to its loading position.

Referring to Fig. 1, the upper end of the rail 28 inclines slightly downwardly to a point where it may readily receive the pulley 12 of the bucket 4 after the latter has been brought to its emptying position. Accordingly, when the bucket has been emptied, a further upward movement thereof will cause the pulley 12 to mount the track 28, whereupon the latter will sustain the weight of the bucket at a sufficient height to permit the hook 22 to be readily withdrawn from the ring head 10. As that part of the chain 19 to which the hook 22 is secured, travels downwardly, the free end of said hook will ride upon the connecting pin 24 behind the one to which it is attached, so as not to interfere with the free movement of the sprocket wheels. (See Fig. 1.)

After the pulley 12 of a bucket 4 mounts the upper end of the track 8, the latter will support said bucket for a downward movement, by gravity, to its load receiving position. In other words, the rail 28 is so inclined that after the pulley 12 passes its uppermost point 29, said pulley will easily travel down to the bottom end thereof, without the necessity of applying any external force to the bucket carried by it. This upward and downward movement of the bucket 4 may be repeated as quickly as the latter may be filled and emptied, without touching the stuffing material, making the conveying operation a highly sanitary one. Furthermore, the labor now required to haul a truckload of meat over the floor between the mixer and stuffer, and the additional and unsanitary operation of throwing the meat from the truck into the stuffer by hand, are entirely eliminated.

In Fig. 5 I have shown a conveying bucket to which a bail is pivoted at its middle portion. This bucket has no swinging bottom, but is emptied from its upper end when the latter is tilted by elevating the lower end thereof. Watery matter such as liver pudding and head cheese may be drawn off through a large faucet 30 or other valve-controlled outlet.

In large slaughter houses, a large amount of meat is usually mixed in a mixing machine and set aside before being deposited in one or more stuffing machines. To meet this use, I have provided the conveying means shown in Fig. 6. These means are practically the same as those shown in Fig. 1, with the exception that the track 28 extends a sufficient distance beyond the stuffing machine 3 is the direction of the mixer 1, to receive from the chain 19 any desired number of conveying buckets 4. The position of the pulley 20 is also changed to one above the end of the track 28. When a bucket 4 is filled, it is elevated by a hook 22 in the manner hereinbefore described to the position shown in Fig. 6, where the pulley 12 will mount the track 28, after which it may be pushed along the latter to a point next to another bucket for storage.

When it is now desired to fill the stuffing machine, the first bucket placed on the track 28 is moved along the latter to a point immediately above the stuffing machine, whereupon it is emptied in the manner hereinbefore described. Thereafter it will descend on the inclined portion of said track to a position from which it may be readily moved forward to receive another load.

I do not wish to be limited to the details of construction and arrangement herein shown and described, and any changes or modifications may be made therein within the scope of the subjoined claims.

Having described my invention, I claim:

1. Means for conveying meat to be stuffed, from a mixing to a stuffing machine, comprising a portable bucket, a sprocket wheel supported near said mixing machine, a second sprocket wheel positioned above the stuffing machine, an endless chain passing around said sprocket wheels, a swinging hook depending from said chain, a bail pivotally secured to said bucket terminating in an eyelet head adapted to receive said hook, by which said bucket may be carried from a position to receive a load from the mixing machine, to a position above the stuffing machine, means for easily emptying the bucket contents into said stuffing machine without touching them, a downwardly inclined track extending from a point below the second sprocket wheel to a point below the first one, and a pulley pivotally secured to the head of said bail, adapted to mount said track after the bucket is emptied to carry the latter along said track to its load-receiving position.

2. Means for conveying meat to be stuffed, from a mixing to a stuffing machine, comprising a portable bucket, a sprocket wheel supported near said mixing machine, a second sprocket wheel positioned above the stuffing machine, an endless chain passing around said sprocket wheels, a swinging hook depending from said chain, a bail pivotally secured to said bucket terminating in an eyelet head to receive said hook, by which said bucket may be carried from a position to receive a load from the mixing machine, to a position above the stuffing machine, a hinged bottom for said bucket to release the contents thereof into the stuffing machine without touching them, a downwardly inclined rail extending from a point below the second sprocket wheel to a point below the first one, a stud extending laterally from the bail head, and a pulley loosely mounted on said stud, adapted to mount said rail after the bucket is emptied to carry the latter along said rail to its load-receiving position.

3. Means for conveying meat to be stuffed, from a mixing to a stuffing machine, comprising a portable bucket, a sprocket wheel supported near said mixing machine, a second sprocket wheel positioned above the stuffing machine, an endless chain passing around said sprocket wheels, said chain comprising a series of laterally disposed pins pivotally connecting a series of pairs of parallel links, a hook having an eyelet end through which one of said pins loosely passes, a sleeve band on each side of said eyelet hook end to hold it in the middle of said connecting pin, a bail for said bucket having an eyelet head to receive said hook for carriage thereby from a position to receive a load from the mixing machine, to a position for emptying the contents thereof into the stuffing machine, a track for conducting said bucket after it is emptied, to its load-receiving position, and a curved end on said hook adapted to rest on the connecting pin behind it during the downward travel thereof, free from interference with said sprocket wheels.

In testimony whereof I have hereunto set my hand this 4th day of Sept., 1917.

HENRY W. BURKHARDT, JR.

Witness:
SIDNEY VAUGHAN.

Copies of this patent may be obtained for five cents each, by addressing the "Commissioner of Patents, Washington, D. C."